US011206527B2

(12) United States Patent
Nenner

(10) Patent No.: US 11,206,527 B2
(45) Date of Patent: Dec. 21, 2021

(54) METHOD FOR PROVISIONING ENHANCED COMMUNICATION CAPABILITIES TO USER EQUIPMENT

(71) Applicant: Deutsche Telekom AG, Bonn (DE)

(72) Inventor: Karl-Heinz Nenner, Bornheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/466,322

(22) PCT Filed: Dec. 11, 2017

(86) PCT No.: PCT/EP2017/082170
§ 371 (c)(1),
(2) Date: Jun. 4, 2019

(87) PCT Pub. No.: WO2018/108786
PCT Pub. Date: Jun. 21, 2018

(65) Prior Publication Data
US 2019/0349745 A1 Nov. 14, 2019

(30) Foreign Application Priority Data
Dec. 13, 2016 (EP) .................................... 16203818

(51) Int. Cl.
*H04W 8/18* (2009.01)
*H04W 8/24* (2009.01)
(Continued)

(52) U.S. Cl.
CPC .......... *H04W 8/183* (2013.01); *H04W 8/245* (2013.01); *H04W 12/04* (2013.01); *H04W 72/048* (2013.01)

(58) Field of Classification Search
USPC ......................................... 455/418, 419, 420
See application file for complete search history.

(56) References Cited

U.S. PATENT DOCUMENTS 5,896,566 A * 4/1999 Averbuch .............. H04W 8/245
455/419
6,023,620 A * 2/2000 Hansson ................... G06F 8/65
455/419

(Continued)

FOREIGN PATENT DOCUMENTS

CN 101873162 A 10/2010
CN 103533664 A 1/2014
(Continued)

Primary Examiner — Jamaal Henson
(74) Attorney, Agent, or Firm — Leydig, Voit & Mayer, Ltd.

(57) ABSTRACT

A communication method for a user equipment includes: receiving, by the user equipment, at least one software component or software module or configuration information via a configuration and/or control channel between the user equipment and a telecommunications network and/or via a first set of communication capabilities of the user equipment, wherein the at least one software component or software module or configuration information is related to a second set of communication capabilities corresponding to enhanced and/or modified communication relative to the first set of communication capabilities, the second set of communication capabilities being related to access-stratum capabilities of the user equipment and/or to non-access-stratum capabilities of the user equipment and/or to other communication services of the user equipment; and activating the second set of communication capabilities.

9 Claims, 1 Drawing Sheet

(51) Int. Cl.
*H04W 12/04* (2021.01)
*H04W 72/04* (2009.01)

(56) References Cited

U.S. PATENT DOCUMENTS

| | | | | |
|---|---|---|---|---|
| 6,052,600 | A * | 4/2000 | Fette | G06F 21/121 370/329 |
| 6,074,435 | A * | 6/2000 | Rojestål | G06F 8/65 717/170 |
| 6,275,694 | B1 * | 8/2001 | Yoshida | G06F 8/65 455/419 |
| 6,549,770 | B1 * | 4/2003 | Marran | H04M 3/42 455/418 |
| 6,587,684 | B1 | 7/2003 | Jay et al. | |
| 6,600,917 | B1 * | 7/2003 | Maupin | H04W 48/16 455/414.1 |
| 6,622,017 | B1 * | 9/2003 | Hoffman | H04M 1/72406 455/419 |
| 6,785,549 | B2 * | 8/2004 | Spartz | H04W 88/06 455/450 |
| 7,266,369 | B2 * | 9/2007 | Moles | H04M 3/42178 455/414.1 |
| 9,760,726 | B2 * | 9/2017 | Berard | H04W 12/06 |
| 2001/0049263 | A1 * | 12/2001 | Zhang | G06F 8/65 455/67.11 |
| 2002/0077094 | A1 * | 6/2002 | Leppanen | H04L 67/303 455/420 |
| 2002/0160763 | A1 * | 10/2002 | Mittal | H04W 8/245 455/418 |
| 2003/0027581 | A1 * | 2/2003 | Jokinen | H04W 12/35 455/456.1 |
| 2003/0033599 | A1 * | 2/2003 | Rajaram | H04W 8/245 717/173 |
| 2003/0063596 | A1 | 4/2003 | Huseyin et al. | |
| 2003/0143952 | A1 * | 7/2003 | Haller | H04L 67/306 455/41.2 |
| 2003/0143991 | A1 * | 7/2003 | Minear | H04L 67/04 455/419 |
| 2003/0163551 | A1 * | 8/2003 | Riordan | H04L 67/34 709/219 |
| 2004/0018831 | A1 * | 1/2004 | Majmundar | H04W 4/06 455/419 |
| 2004/0073901 | A1 * | 4/2004 | Imamatsu | G06F 8/65 717/170 |
| 2004/0221284 | A1 * | 11/2004 | Costello | H04L 69/40 717/172 |
| 2004/0261072 | A1 * | 12/2004 | Herle | H04W 8/245 717/171 |
| 2005/0164693 | A1 * | 7/2005 | Yach | H04M 3/537 455/419 |
| 2005/0273779 | A1 * | 12/2005 | Cheng | G06F 8/61 717/168 |
| 2006/0106806 | A1 * | 5/2006 | Sperling | G06F 21/57 |
| 2006/0130053 | A1 * | 6/2006 | Buljore | H04L 69/329 717/173 |
| 2006/0262743 | A1 * | 11/2006 | Kalhan | H04L 67/125 370/328 |
| 2007/0130331 | A1 * | 6/2007 | Kao | H04L 69/24 709/224 |
| 2008/0141239 | A1 * | 6/2008 | Larsson | H04W 8/245 717/173 |
| 2009/0007091 | A1 * | 1/2009 | Appiah | G06F 8/658 717/171 |
| 2009/0068969 | A1 * | 3/2009 | Lindoff | H04W 48/18 455/161.1 |
| 2009/0133014 | A1 * | 5/2009 | Laurila | G06F 8/60 717/174 |
| 2010/0177779 | A1 | 7/2010 | Yasuto | |
| 2010/0234008 | A1 * | 9/2010 | Kumar | H04W 4/50 455/419 |
| 2011/0092253 | A1 * | 4/2011 | Amiel | H04W 8/265 455/558 |
| 2011/0142007 | A1 | 6/2011 | May et al. | |
| 2012/0214441 | A1 * | 8/2012 | Raleigh | H04L 9/32 455/406 |
| 2013/0023236 | A1 * | 1/2013 | Murray | H04W 4/50 455/411 |
| 2013/0157637 | A1 * | 6/2013 | Bos | H04W 8/245 455/418 |
| 2013/0283257 | A1 * | 10/2013 | Sen | G06F 8/656 717/173 |
| 2014/0031022 | A1 * | 1/2014 | Sen | H04W 48/08 455/418 |
| 2015/0126108 | A1 | 5/2015 | Ashley et al. | |
| 2015/0148020 | A1 * | 5/2015 | Laden | H04W 12/08 455/418 |
| 2015/0172997 | A1 * | 6/2015 | Griot | H04W 12/04 455/411 |
| 2015/0181419 | A1 * | 6/2015 | Mistry | H04W 8/18 455/419 |
| 2016/0105792 | A1 * | 4/2016 | Mohammed | H04W 8/205 455/418 |
| 2016/0165531 | A1 | 6/2016 | Axel et al. | |
| 2016/0205546 | A1 * | 7/2016 | Poon | H04W 8/22 455/419 |
| 2016/0259923 | A1 * | 9/2016 | Papa | H04W 12/08 |
| 2019/0180869 | A1 * | 6/2019 | Volpe | A61N 1/3993 |

FOREIGN PATENT DOCUMENTS

| | | |
|---|---|---|
| CN | 103579759 A | 2/2014 |
| CN | 105493573 A | 4/2016 |
| CN | 205356491 U | 6/2016 |
| WO | WO 2009078566 A1 | 6/2009 |

* cited by examiner

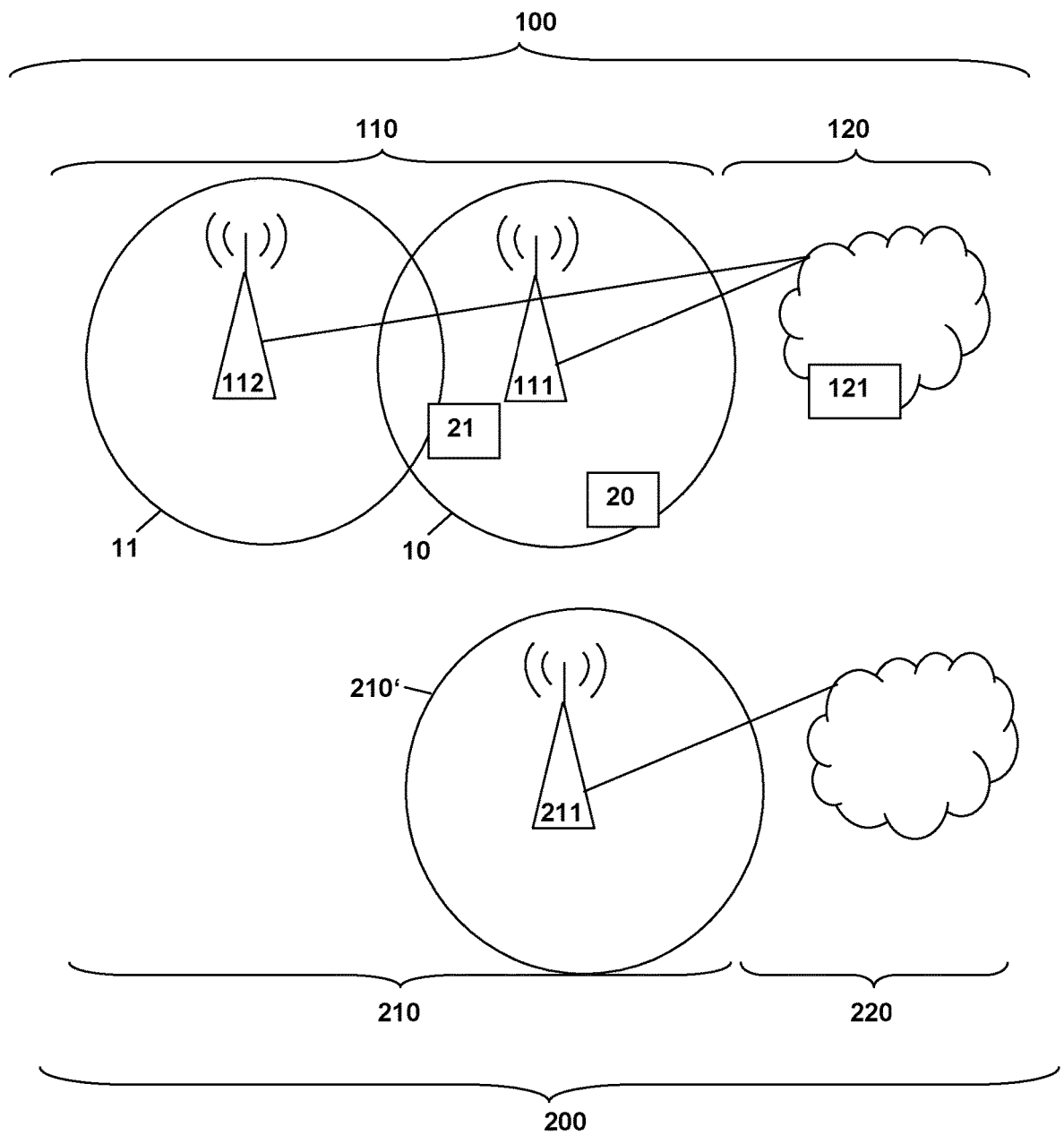

METHOD FOR PROVISIONING ENHANCED COMMUNICATION CAPABILITIES TO USER EQUIPMENT

CROSS-REFERENCE TO RELATED APPLICATIONS

This application is a U.S. National Phase application under 35 U.S.C. § 371 of International Application No. PCT/EP2017/082170, filed on Dec. 11, 2017, and claims benefit to European Patent Application No. EP 16203818.6, filed on Dec. 13, 2016. The International Application was published in English on Jun. 21, 2018 as WO 2018/108786 under PCT Article 21(2).

FIELD

The present invention relates a method for an enhanced and/or modified communication of a user equipment with a telecommunications network and/or with a further telecommunications network in view of access-stratum capabilities and/or in view of non-access-stratum capabilities and/or in view of other communication services of the user equipment.

Furthermore, the present invention relates to a telecommunications network for an enhanced and/or modified communication of a user equipment with the telecommunications network in view of access-stratum capabilities and/or in view of non-access-stratum capabilities and/or in view of other communication services of the user equipment.

Additionally, the present invention relates to a system for an enhanced and/or modified communication of a user equipment with a telecommunications network and/or with further telecommunications network in view of access-stratum capabilities and/or in view of non-access-stratum capabilities and/or in view of other communication services of the user equipment, the system comprising the telecommunications network and/or the further telecommunications network and at least the user equipment.

Additionally, the present invention relates to a program and to a computer program product for an enhanced and/or modified communication of a user equipment with a telecommunications network in view of access-stratum capabilities and/or in view of non-access-stratum capabilities and/or in view of other communication services of the user equipment.

BACKGROUND

The present invention relates to the area of communication devices (especially mobile devices or user equipments) being used in or in connection with telecommunications networks, especially mobile communication networks. Typically, communication devices—especially mobile communication devices such as mobile phones—are usually sold to end users with a given hardware and software and/or firmware such that the communication capabilities of such devices cannot, or only marginally, be changed after the device has reached the end user or customer or at least after the end user or customer has initially used the communication device.

Typically, this means that the communication capabilities are defined or limited by the respective combination of the hardware, the software and/or the firmware of the communication device which that device has (or had) upon sale, i.e. at the time when the device was sold or initially used by the respective user. In case of, e.g., a cellular phone, even though it might be possible to upgrade the platform software (or operating system, e.g. iOS, Android, Windows Phone), it is in general not possible to apply updates in respect to the capabilities of that communication device related to communication within a given telecommunications network. This means that a cellular device that is sold (or initially used) with a first set of communication capabilities (such as, e.g., Universal Mobile Telecommunications Service (UMTS)/high speed packet access (HSPA) networking capabilities) but not a second set of communication capabilities (such as, e.g., Long-Term Evolution (LTE) networking capabilities) would typically never during its lifetime be able to use such a second set of communication capabilities (in this example LTE networks)—even in case that the hardware capabilities of that considered device are sufficient.

SUMMARY

In an exemplary embodiment, the present invention provides a communication method for a user equipment. The method includes: receiving, by the user equipment, at least one software component or software module or configuration information via a configuration and/or control channel between the user equipment and a telecommunications network and/or via a first set of communication capabilities of the user equipment, wherein the at least one software component or software module or configuration information is related to a second set of communication capabilities corresponding to enhanced and/or modified communication relative to the first set of communication capabilities, the second set of communication capabilities being related to access-stratum capabilities of the user equipment and/or to non-access-stratum capabilities of the user equipment and/or to other communication services of the user equipment; and activating the second set of communication capabilities.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a telecommunications network according to the present invention, comprising a telecommunications network or mobile communication network, and a plurality of user equipments connected to the telecommunications network (or mobile communication network). Additionally, a further telecommunications network or further mobile communication network is schematically shown.

DETAILED DESCRIPTION

Exemplary embodiments of the present invention provide an effective and simple solution (especially reducing operational costs (OPEX costs)) to provide for an enhanced and/or modified communication of a user equipment with a telecommunications network and/or with a further telecommunications network in view of access-stratum capabilities and/or in view of non-access-stratum capabilities and/or in view of other communication services of the user equipment such that overall flexibility, especially of using the user equipment as well as within the telecommunications network and/or the further telecommunications network can be increased and the use of device capabilities as well as network capabilities be enhanced.

In an exemplary embodiment, the present invention provides a method for an enhanced and/or modified communication of a user equipment with a telecommunications network and/or with a further telecommunications network in view of access-stratum capabilities and/or in view of non-access-stratum capabilities and/or in view of other communication services of the user equipment,
wherein a configuration and/or control channel is provided or is able to be at least temporarily provided between the user equipment and the telecommunications network and/or between the user equipment and the further telecommunications network, wherein the user equipment has
  either besides using the configuration and/or control channel
  or instead of using the configuration and/or control channel
a first set of communication capabilities, the first set of communication capabilities being related to access-stratum capabilities of the user equipment and/or to non-access-stratum capabilities of the user equipment and/or to other communication services of the user equipment,
wherein in order to provide an enhanced and/or modified communication—as compared to the first set of communication capabilities—of the user equipment with the telecommunications network and/or within the further telecommunications network, the method comprises the following steps:
  in a first step,
    either the configuration and/or control channel is established or activated in case that the user equipment has the first set of communication capabilities besides using the configuration and/or control channel, the establishment and/or activation of the configuration and/or control channel being triggered either by the user equipment or by the telecommunications network or by the further telecommunications network,
    or the first set of communication capabilities is—at least partly—activated in case that the user equipment has the first set of communication capabilities instead of using the configuration and/or control channel,
  in a second step subsequent to the first step, at least one software component or software module or configuration information is transmitted to the user equipment, using the established and activated configuration and/or control channel and/or using the first set of communication capabilities, the at least one software component or software module or configuration information being related to a second set of communication capabilities, the second set of communication capabilities being related to access-stratum capabilities of the user equipment and/or to non-access-stratum capabilities of the user equipment and/or to other communication services of the user equipment,
  in a third step subsequent to the second step, the second set of communication capabilities is activated.

It is thereby advantageously possible according to the present invention that the second set of communication capabilities is able to be used by the user equipment and with respect to the telecommunications network or with respect to the further telecommunications network or with respect to both the telecommunications network and the further telecommunications network. This means that—according to the present invention—the communication capabilities of the user equipment or the mobile device (or, more generally, of the communication device) are, even for normal or standard users of such devices, no longer limited by the respective combination of the hardware, the software and/or the firmware of the communication device upon sale (or at the time of an initial use of the communication device or user equipment) but that it is advantageously possible according to the present invention that updates or modifications are applied to such a user equipment as, e.g., a cellular phone with respect to the capabilities of that user equipment or communication device related to communication within a given telecommunications network. For example, this means that a user equipment or cellular device that is sold (or initially used) with a first set of communication capabilities (such as, e.g., UMTS/HSPA networking capabilities) but not a second set of communication capabilities (such as, e.g., LTE networking capabilities) is able to be modified such that the second set of communication capabilities (in this example LTE networks) is able to be used (in dependency, of course, that the hardware capabilities of the considered device being such that the second set of communication capabilities is supported by that hardware and/or possible with that hardware).

According to the present invention, the enhanced and/or modified communication capabilities of the considered user equipment especially relate to access-stratum capabilities and/or to non-access-stratum capabilities and/or to other communication services of the user equipment. In order to be able to use the second set of communication capabilities, different scenarios are possible according to the present invention, leading to different embodiments of the present invention.

According to the present invention, it is possible that the configuration and/or control channel being able to be at least temporarily provided between the user equipment and the telecommunications network and/or between the user equipment and the further telecommunications network can be understood as the configuration and/or control channel being able to be provided at least for a limited or fixed or predefined duration of time (especially by establishing the configuration and/or control channel during the first step and using the configuration and/or control channel during the second step and possibly terminating the configuration and/or control channel afterwards).

According to the present invention, it is, e.g., possible that the user equipment—in the delivery state—does not know the access stratum (AS) protocol and/or the non-access stratum (NAS) protocol of the network, in which it ultimately logs in. Regarding the "other communication services", it is, e.g., possible that the user equipment—in its delivery state—does not know how telephony (i.e., the other communication service) works in the destination network and only learns this by obtaining the at least one software component or software module or configuration information being related to a second set of communication capabilities.

According to a first scenario or a first embodiment of the present invention, the first set of communication capabilities is used by the user equipment while the user of that user equipment is communicating with(in) the telecommunications network, i.e. payload data are exchanged between the telecommunications network (and/or the further telecommunications network) and that considered user equipment, using the first set of communication capabilities. In addition to using the first set of communication capabilities in an operative manner, a configuration and/or control channel is provided or is able to be at least temporarily provided between the user equipment and the telecommunications network and/or between the user equipment and the further telecommunications network. According to such a first scenario or first embodiment of the present invention, in a first step, that configuration and/or control channel is established or activated, and the establishment and/or activation of the configuration and/or control channel is triggered either by the user equipment or by the telecommunications network (or by the further telecommunications network). In a second step, subsequent to the first step, at least one software component or software module or configuration information is transmitted to the user equipment, using the established and activated configuration and/or control channel, the at least one software component or software module or configuration information being related to the second set of communication capabilities, the second set of communication capabilities being related to access-stratum capabilities of the user equipment and/or to non-access-stratum capabilities of the user equipment and/or to other communication services of the user equipment, and in a third step, subsequent to the second step, the second set of communication capabilities is activated. Hence, according to the first scenario or first embodiment of the present invention, the first set of communication capabilities is not used for transmitting the at least one software component or software module or configuration information that is related to (and provides the possibility for the user equipment) to use the second set of communication capabilities.

According to a second scenario or a second embodiment of the present invention, the first set of communication capabilities is used to transmit the at least one software component or software module or configuration information that is related to (and provides the possibility for the user equipment) to use the second set of communication capabilities; hence the user equipment is not necessarily provided (or is able to be temporarily provided) with the configuration and/or control channel but it has the first set of communication capabilities instead of using the configuration and/or control channel. According to such a second scenario or second embodiment of the present invention, in a first step, the first set of communication capabilities is—at least partly—activated. In a second step, subsequent to the first step, at least one software component or software module or configuration information is transmitted to the user equipment, using the first set of communication capabilities, the at least one software component or software module or configuration information being related to a second set of communication capabilities (the second set of communication capabilities being related to access-stratum capabilities of the user equipment and/or to non-access-stratum capabilities of the user equipment and/or to other communication services of the user equipment), and in a third step subsequent to the second step, the second set of communication capabilities is activated.

According to a third scenario of a third embodiment of the present invention, the first and second scenarios or embodiments are combined, i.e. in addition to using the first set of communication capabilities (especially but not necessarily in an operative manner), the configuration and/or control channel is provided or is able to be at least temporarily provided between the user equipment and the telecommunications network and/or between the user equipment and the further telecommunications network. In a first step according to such a third scenario or embodiment, both the first set of communication capabilities and the configuration and/or control channel are established or (at least partly) activated, the establishment and/or activation of the configuration and/or control channel being triggered either by the user equipment or by the telecommunications network or by the further telecommunications network, wherein in a second step, subsequent to the first step, at least one software component or software module or configuration information is transmitted to the user equipment, using both the established and activated configuration and/or control channel and using the first set of communication capabilities (i.e. especially a first part of the at least one software component or software module or configuration information is transmitted using the established and activated configuration and/or control channel and a second part of the at least one software component or software module or configuration information is transmitted using the first set of communication capabilities. Again, the at least one software component or software module or configuration information (or both its first and second parts) is related to a second set of communication capabilities, the second set of communication capabilities being related to access-stratum capabilities of the user equipment and/or to non-access-stratum capabilities of the user equipment and/or to other communication services of the user equipment. Again, in a third step subsequent to the second step, the second set of communication capabilities is activated for or within the user equipment.

According to a further embodiment of the present invention, especially being able to be combined with either one of the previously mentioned scenarios or embodiments, it is advantageously possible that, via activating the second set of communication capabilities, an enhanced and/or modified communication of the user equipment with the telecommunications network or within the further telecommunications network is enabled as compared to the first set of communication capabilities.

Thereby, it is advantageously possible according to the present invention to expand (or enhance and/or modify) the communication capabilities of the user equipment (from the first set of communication capabilities to the second set of communication capabilities) to be used (either besides the first set of communication capabilities or instead the first set of communication capabilities) either within the telecommunications network or within the further telecommunications network or within both the telecommunications network and the further telecommunications network.

According to a further embodiment of the present invention, especially being able to be combined with either one of the previously mentioned scenarios or embodiments, it is advantageously possible that the configuration and/or control channel is realized via
  either a side channel,
  or a bootstrapping channel,
  or via both a side channel and a bootstrapping channel,
wherein, preferably, the side channel is established only temporarily, the side channel especially using an access technology different from the access technology used for either the first set of communication capabilities or the second set of communication capabilities, wherein, preferably, the bootstrapping channel corresponds to a default communication capability of the user equipment with the telecommunications network or with the further telecommunications network, the bootstrapping channel especially using an access technology different from the access technology used for either the first set of communication capabilities or the second set of communication capabilities.

Thereby, it is advantageously possible according to the present invention to provide the configuration and/or control channel using different possibilities.

It is possible that the side channel is established only temporarily, i.e., only for limited or fixed or predefined duration of time. For example, it is possible that the side channel is realized only temporarily, i.e., for a limited duration of time, e.g. by using an auxiliary device such as a personal computer to download and transfer the required software and/or firmware to the user equipment using another network access available to the device, e.g. wireless local area network (WLAN) in the case of a cellular device. It is possible that the side channel is a channel that is not related to the primary purpose of the user equipment.

According to a further embodiment of the present invention, especially being able to be combined with either one of the previously mentioned scenarios or embodiments, it is advantageously possible that—either during or prior to the second step—an identification information is transmitted to the telecommunications network, the identification information being provided to identify the user equipment, wherein the identification information especially comprises
- a vendor identification information and/or
- a device identification information, and/or
- a software and/or hardware identification information and/or a software and/or hardware revision number or revision information.

Thereby, it is advantageously possible according to the present invention that the user equipment and/or its user or the corresponding subscriber or subscriber identity is able to be related to or assigned to the at least one software component or software module or configuration information that is transmitted to the user equipment using either the configuration and/or control channel or the first set of communication capabilities or both.

According to a further embodiment of the present invention, especially being able to be combined with either one of the previously mentioned scenarios or embodiments, it is advantageously possible that the transmission—to the user equipment and during the second step—of the at least one software component or software module or configuration information is initiated and/or invoked, during the second step and/or prior to the second step, via a triggering information, the triggering information being at least one out of the following:
- a download link,
- a hyper link on a web page,
- a scan code, the scan code especially being photographed by a camera device or camera module of the user equipment, wherein the scan code being especially provided by a webpage and/or by an online portal of the operator of the telecommunications network or of the further telecommunications network and/or by a message, especially an e-mail-message
- Bluetooth beacon
- device to device (D2D) communication
- radio-frequency identification (RFID)/near-field communication (NFC) tag.

Thereby, it is advantageously possible according to the present invention to easily and conveniently trigger the transmission of the at least one software component or software module or configuration information to the user equipment.

According to a further embodiment of the present invention, especially being able to be combined with either one of the previously mentioned scenarios or embodiments, it is advantageously possible that the second set of communication capabilities refers—compared to the first set of communication capabilities—to at least one out of the following:
- a different radio access technology and/or a different generation of radio access technology,
- the same radio access technology but providing and/or offering to apply a different or additional data transmission characteristics, especially quality-of-service characteristics,
- the same radio access technology but providing and/or offering to apply a different or additional communication service or service profile.

Thereby, it is advantageously possible according to the present invention to provide a higher degree of flexibility when using the user equipment within the telecommunications network or within the further telecommunications network.

According to a further embodiment of the present invention, especially being able to be combined with either one of the previously mentioned scenarios or embodiments, it is advantageously possible that the second set of communication capabilities depends on the subscription profile or subscription information associated with or related to—within the telecommunications network—the user equipment and/or associated with or related to the user related to the user equipment.

Thereby, it is advantageously possible according to the present invention to provide the at least one software component or software module or configuration information in a flexible manner and adapted to the specific user equipment or mobile device considered.

Furthermore, the present invention relates to a telecommunications network for an enhanced and/or modified communication of a user equipment with the telecommunications network in view of access-stratum capabilities and/or in view of non-access-stratum capabilities and/or in view of other communication services of the user equipment, wherein a configuration and/or control channel is provided or able to be temporarily provided between the user equipment and the telecommunications network, wherein the user equipment has
- either besides using the configuration and/or control channel
- or instead of using the configuration and/or control channel a first set of communication capabilities, the first set of communication capabilities being related to access-stratum capabilities of the user equipment and/or to non-access-stratum capabilities of the user equipment and/or to other communication services of the user equipment,
wherein in order to provide an enhanced and/or modified communication—as compared to the first set of communication capabilities—of the user equipment with the telecommunications network, the telecommunications network is configured such that:
- either the configuration and/or control channel is established or activated in case that the user equipment has the first set of communication capabilities besides using the configuration and/or control channel, the establishment and/or activation of the configuration and/or control channel being triggered either by the user equipment or by the telecommunications network or by the further telecommunications network,
- or the first set of communication capabilities is—at least partly—activated in case that the user equipment has the first set of communication capabilities instead of using the configuration and/or control channel,
- at least one software component or software module or configuration information is transmitted to the user equipment, using the established and activated configuration and/or control channel and/or using the first set of communication capabilities, the at least one software component or software module or configuration information being related to a second set of communication capabilities, the second set of communication capabilities being related to access-stratum capabilities of the user equipment and/or to non-access-stratum capabilities of the user equipment and/or to other communication services of the user equipment, the second set of communication capabilities is activated.

Thereby, it is advantageously possible to realize the enhanced flexibility according to the present invention within the telecommunications network.

Furthermore, the present invention relates to a system for an enhanced and/or modified communication of a user equipment with a telecommunications network and/or with further telecommunications network in view of access-stratum capabilities and/or in view of non-access-stratum capabilities and/or in view of other communication services of the user equipment, the system comprising the telecommunications network and/or the further telecommunications network and at least the user equipment, wherein a configuration and/or control channel is provided or able to be temporarily provided between the user equipment and the telecommunications network and/or between the user equipment and the further telecommunications network, wherein the user equipment has either besides using the configuration and/or control channel or instead of using the configuration and/or control channel a first set of communication capabilities, the first set of communication capabilities being related to access-stratum capabilities of the user equipment and/or to non-access-stratum capabilities of the user equipment and/or to other communication services of the user equipment, wherein in order to provide an enhanced and/or modified communication—as compared to the first set of communication capabilities—of the user equipment with the telecommunications network and/or within the further telecommunications network, the system is configured such that:

either the configuration and/or control channel is established or activated in case that the user equipment has the first set of communication capabilities besides using the configuration and/or control channel, the establishment and/or activation of the configuration and/or control channel being triggered either by the user equipment or by the telecommunications network or by the further telecommunications network, or the first set of communication capabilities is—at least partly—activated in case that the user equipment has the first set of communication capabilities instead of using the configuration and/or control channel, at least one software component or software module or configuration information is transmitted to the user equipment, using the established and activated configuration and/or control channel and/or using the first set of communication capabilities, the at least one software component or software module or configuration information being related to a second set of communication capabilities, the second set of communication capabilities being related to access-stratum capabilities of the user equipment and/or to non-access-stratum capabilities of the user equipment and/or to other communication services of the user equipment, the second set of communication capabilities is activated.

Thereby, it is advantageously possible to provide a system that is capable of providing the enhanced flexibility according to the present invention, applied within such a system to the telecommunications network and to at least one user equipment.

Additionally, the present invention relates to a program comprising a computer readable program code which, when executed on a computer and/or on a user equipment and/or on a network node or on a plurality of network nodes of a telecommunications network, or in part on a user equipment and/or in part on a network node or on a plurality of network nodes of a telecommunications network, to perform an exemplary embodiment of the inventive method.

Still additionally, the present invention relates to a computer program product for an enhanced and/or modified communication of a user equipment with a telecommunications network in view of access-stratum capabilities and/or in view of non-access-stratum capabilities and/or in view of other communication services of the user equipment, the computer program product comprising a computer program stored on a storage medium, the computer program comprising program code which, when executed on a computer and/or on a user equipment and/or on a network node or on a plurality of network nodes of a telecommunications network, or in part on a user equipment and/or in part on a network node or on a plurality of network nodes of a telecommunications network, to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100, e.g. a mobile communication network such as a public land mobile network, and a further telecommunications network 200, e.g. a further mobile communication network, are schematically shown. The telecommunications network 100 is associated to (or assigned to) a user equipment 20 (or the user equipment 20 is assigned to the telecommunications network 100), resulting in the telecommunications network 100 especially being the home network or home mobile communication network of the user equipment 20. The present invention especially also relates to the situation of the user equipment 20 being in a roaming situation, i.e. the user equipment 20 being connected not to telecommunications network 100 (or home mobile communication network) but to the further telecommunications network 200, which is also referred to by the term visited telecommunications network.

The telecommunications network 100 comprises an access network 110 or access part and a core network 120. The telecommunications network 100 is, e.g., a cellular mobile communication network comprising typically a plurality of network cells or radio cells two of which, a first radio cell 10 and a second radio cell 11 of the telecommunications network 100 being depicted in FIG. 1. The access network 110 comprises at least one first access entity 111 such as (especially in case of mobile communication networks) a base station entity enabled to serve a user equipment 20 within its radio coverage area. In that case the user equipment 20 is able to be connected to the first access entity 111 via a radio link or a wireless communication link. The further telecommunications network 200 comprises a further access network 210 or access part and a further core network 220. The further telecommunications network 200 is, e.g., a cellular mobile communication network comprising typically a plurality of network cells or radio cells, one of which is schematically depicted and designated via reference sign 210' in FIG. 1. The further telecommunications network 200 (or its further access network 210) comprises at least one access entity 211 such as (especially in case of mobile communication networks) a base station entity enabled to serve the user equipment 20. In case of the further telecommunications network 200 being a mobile communication network, the access entity 211 typically serves a radio cell, i.e. a radio coverage area of the second access entity 211 or associated to the second access entity 211, and the user equipment 20 is able to be connected to the second access entity 211 via a radio link or wireless communication link.

In the exemplary representation of the situation depicted in FIG. 1, the user equipment 20 is connected to the telecommunications network 100.

According to the present invention, a method, a telecommunications network, and a system for an enhanced and/or modified communication of the user equipment 20 with the telecommunications network 100 and/or with the further telecommunications network 200 is provided. The enhanced and/or modified communication especially refers to access-stratum capabilities and/or to non-access-stratum capabilities and/or to other communication services of the user equipment.

Especially according to a first scenario or first embodiment of the present invention, a configuration and/or control channel is provided or is able to be at least temporarily provided between the user equipment 20 and the telecommunications network 100 and/or between the user equipment 20 and the further telecommunications network 200, and the user equipment 20 has—besides using the configuration and/or control channel—a first set of communication capabilities being related to access-stratum capabilities of the user equipment and/or to non-access-stratum capabilities of the user equipment and/or to other communication services of the user equipment. In order for a second set of communication capabilities being able to be applied for the user equipment 20 (i.e. the communication of the user equipment 20 with the telecommunications network 100 (and/or with the further telecommunications network 200) being enhanced and/or modified), at least one software component or software module or configuration information needs to be transmitted to the user equipment 20. According to the first scenario or first embodiment, this is done using the configuration and/or control channel being established and/or activated.

According to a second scenario or second embodiment of the present invention, wherein the first set of communication capabilities is used to transmit the at least one software component or software module or configuration information to the user equipment 20, and according to a third scenario or third embodiment of the present invention, both the configuration and/or control channel and the first set of communication capabilities are used to transmit the at least one software component or software module or configuration information to the user equipment 20.

Generally, according to the present invention, in the first step, the transmission path to transmit the at least one software component or software module or configuration information is generated or provided (via establishing and/or activating the configuration and/or control channel and/or via activating the first set of communication capabilities), and in the second step, the at least one software component or software module or configuration information is transmitted to the user equipment 20, and in the third step, the second set of communication capabilities is activated.

Conventionally, even a communication device (or user equipment 20, such as a UMTS mobile device, i.e. having a first set of communication capabilities) having sufficiently capable hardware to use, e.g., LTE-functionality (as an example of the second set of communication capabilities), such a user equipment will not be able to use LTE-functionality (or, more general, the second set of communication capabilities). Likewise, an LTE legacy phone can, conventionally, not use VoLTE (Voice over LTE), and an LTE phone will not be able to use 5G, etc.

An additional drawback of this situation according to the state of the art is that the communication capabilities are typically determined by the sales features of the devices or user equipments 20. However, according to the present invention, it is advantageously possible that the communication capabilities of the considered user equipment 20 is dependent on, e.g., what the telecommunications network 100 offers, the subscription (within that telecommunications network 100) allows, or whether the user equipment 20 is roaming (in a further telecommunications network 200) or not.

According to the present invention, the user equipment 20 is able to "learn" new modes of communication during its lifetime or time of use. According to the present invention, at least according some scenarios or embodiments, this is achieved via using a configuration and/or control channel (e.g. either a "side channel", e.g. using an auxiliary device such as a personal computer to download and transfer the required software and/or firmware to the device (i.e. to the user equipment 20) using another network access available to the device, e.g. WLAN in the case of a cellular device, or by using a "bootstrapping channel" on the target network (i.e. the telecommunications network 100 or the further telecommunications network 200) of the considered device, i.e. the user equipment 20. In case of a cellular telecommunications network 100, a bootstrapping channel can be achieved by adding a "default" channel supported by the (or virtually every) device (or user equipment 20) upon sale, via which bootstrapping channel (i.e. the configuration and/or control channel) the device is able to download software and/or firmware that it then uses to access the telecommunications network 100 (or the further telecommunications network 200) on "higher level" channels. Once this has been done, the user equipment 20 is then able to use its newly learned access stratum capabilities (i.e. the second set of communication capabilities) to download any additional non-access stratum software or firmware or services software or firmware.

For example, the bootstrapping channel could require the standardization of a "Basic Mode" in 5G, over which the user equipment then learns how it gets the 2 Gb/s, which could then also be different in each network. A further example would be that the user equipment only learns the respective AS and/or NAS protocol via the "Basic Mode".

As an example, on a 2G/3G/4G network, the device or user equipment 20 may only support basic GPRS900 and it uses this channel to download software and/or firmware which then allows it to use 3G and 4G radio on that network. Once it can access 4G, it uses this to download non-access stratum and/or services software. This allows the user equipment 20 to be sold to the end user with only the side channel or bootstrapping channel communication capability, and (especially in case of using the bootstrapping channel, i.e. the configuration and/or control channel) without any non-access stratum functions. Once the device or user equipment 20 is activated by the user (e.g. by purchasing a subscription), it is able to learn the network capabilities in access stratum, non-access stratum and service layers through the side channel or bootstrapping channel.

According to the present invention, it is advantageously possible according to the present invention, that it allows to configure the device capabilities (i.e. the second set of communication capabilities) tailor-made to the network capabilities, the access subscription (e.g. by taking into account whether or not LTE-functionality is available, which HSPA and/or LTE speed is applicable), the subscribed services, etc. As a consequence, it is no longer necessary to apply speed limiting or traffic shaping in the telecommunications network 100 (or the further telecommunications network 200), as the device or user equipment 20 can be tailored to the properties of the subscription—and this can be easily changed at any time when the device or user equipment 20 roams to another network (i.e. the further telecommunications network 200), it can learn how to work on the new network (or further telecommunications network 200), even if its initial capability, or its capabilities learned so far, do not provide the necessary functionality.

According to the present invention, standardization is only needed for the configuration and/or control channel, especially the side channel or the bootstrapping channel, rather than for every single access stratum/non-access stratum/services aspect that any network in the world (i.e. any further telecommunications network 200) may possibly offer.

The present invention may include the following implementation steps:
 device supports an available side channel and/or device and network support bootstrapping channel(s) (globally, there could be more than a single one);
 device software or firmware for access stratum/non-access stratum/services are provided, assumption is that the device vendor (possibly in cooperation with the network operator) would provide this for all supported networks;
 software/firmware is accessible via the side channel (off-network) or in case of bootstrapping (on-network) via the bootstrapping channel for access stratum, and via the access stratum-only access for non-access stratum/services software (Conventionally, in presently known scenarios according to the state of the art, downloads are not possible without non-access stratum software on the device or user equipment 20);
 a mixed scenario is also possible, where the device would learn access-stratum capabilities off-network and then use the new access stratum capabilities to download non-access stratum/services software on-network;
 device needs to be identified so that the correct software/firmware is obtained;
 subscription identity is provided and used to obtain and configure the firmware/software according to the subscription;
 serving network identity is provided and used to obtain and configure the firmware/software according to the serving network.

According to the present invention, identifying the device or user equipment 20 is provided, e.g., via using a vendor identity (or vendor identity information), a device identity (or device identity information) and software/hardware revision number.

Furthermore according to the present invention, subscription information is able to be obtained from the operator's information technology resources (network entities) and/or a customer-relationship management system (CRM system) or, if already available from a subscription repository in the network (such as a Home Location Register). The new software and/or firmware is, e.g., downloaded by providing a download link to the terminal, e.g. a hyperlink on a web page, a scan code that would be photographed by the device using e.g. an inbuilt camera, where that code could be provided on a webpage such as an operator's online portal, or via (e)mail. Alternatively, a push mode solution may apply according to the present invention, the push mode solution especially being applied by the telecommunications network 100 for the software and/or firmware download.

According to an alternative embodiment of the present invention, the desired capabilities of the device or user equipment 20 are changed (e.g. subscription change, roaming to anther network) via reconfiguring the already existing software (rather than using a different firmware and/or software), wherein the reconfiguration uses the above solution or any other OTA (over the air) mechanism.

According to the present invention, it is advantageously possible that installing and/or configuring the desired firmware and/or software (in order to apply the second set of communication capabilities) can be done proactively (e.g. before travelling to another region with different networks), especially when using the side channel, or it can occur fully automatically e.g. when the subscription changes or the device is turned on within a "new" network (i.e. the further telecommunications network 200) such as after arrival at a destination airport. One can also use the mixed scenario, where access stratum of the new network (or further telecommunications network 200) is loaded proactively, and then non-access stratum/services software is obtained on-network after arrival at the destination.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A communication method for a user equipment, wherein the method comprises:
receiving, by the user equipment, at least one software component or software module or configuration information via a configuration and/or control channel between the user equipment and a telecommunications network, wherein the user equipment is sold having a first set of communication capabilities but not having a second set of communication capabilities, wherein the first set of communication capabilities is related to access-stratum capabilities of the user equipment, non-access stratum capabilities of the user equipment and/or other communication services of the user equipment, wherein the at least one software component or software module or configuration information is related to the second set of communication capabilities, wherein the second set of communication capabilities is related to access-stratum capabilities of the user equipment, non-access-stratum capabilities of the user equipment and/or other communication services of the user equipment, wherein the second set of communication capabilities corresponds to a different radio access technology and/or a different generation of radio access technology relative to the first set of communication capabilities, wherein the configuration and/or control channel is realized via a side channel, wherein the side channel is realized by using an auxiliary device, and wherein the side channel is established only temporarily using an access technology available to the auxiliary device which is different from an access technology used for the first set of communication capabilities or the second set of communication capabilities; and
activating the second set of communication capabilities, wherein based on activating the second set of communication capabilities, the user equipment is modified to be able to use the second set of communication capabilities for communication with the telecommunications network in addition to being able to use the first set of communication capabilities;
wherein the second set of communication capabilities corresponds to Long Term Evolution (LTE) networking capabilities, wherein the user equipment is sold without the capability of connecting to LTE networks, and wherein based on activating the second set of communication capabilities, the user equipment is modified so as to be able to connect to LTE networks.

2. The method according to claim 1, wherein the configuration and/or control channel is realized via the side channel and via a bootstrapping channel.

3. The method according to claim 2, wherein the bootstrapping channel corresponds to a default communication capability of the user equipment with the telecommunications network, the bootstrapping channel using an access technology different from the access technology used for either the first set of communication capabilities or the second set of communication capabilities.

4. The method according to claim 1, wherein during or prior to reception of the at least one software component or software module or configuration information, identification information is transmitted to the telecommunications network, the identification information being provided to identify the user equipment, wherein the identification information comprises:
vendor identification information;
device identification information;
software and/or hardware identification information; and/or
a software and/or hardware revision number or revision information.

5. The method according to claim 1, wherein transmission of the at least one software component or software module or configuration information is initiated and/or invoked based on triggering information, the triggering information being at least one out of the following:
a download link;
a hyperlink on a web page; or
a scan code.

6. The method according to claim 1, wherein the second set of communication capabilities depends on a subscription profile or subscription information associated with or related to the user equipment and/or associated with or related to a user related to the user equipment.

7. The method according to claim 1, wherein the auxiliary device is a personal computer.

8. A telecommunications system, comprising:
at least one access entity; and
an auxiliary device;
wherein the at least one access entity and the auxiliary device are configured to cooperate to facilitate:
transmitting at least one software component or software module or configuration information to a user equipment via a configuration and/or control channel between a telecommunications network and the user equipment, wherein the user equipment is sold having a first set of communication capabilities but not having a second set of communication capabilities, wherein the first set of communication capabilities is related to access-stratum capabilities of the user equipment, non-access stratum capabilities of the user equipment and/or other communication services of the user equipment, wherein the at least one software component or software module or configuration information is related to the second set of communication capabilities, wherein the second set of communication capabilities is related to access-stratum capabilities of the user equipment, non-access-stratum capabilities of the user equipment and/or other communication services of the user equipment, wherein the second set of communication capabilities corresponds to a different radio access technology and/or a different generation of radio access technology relative to the first set of communication capabilities, wherein the configuration and/or control channel is realized via a side channel, wherein the side channel is realized by using the auxiliary device, and wherein the side channel is established only temporarily using an access technology available to the auxiliary device which is different from an access technology used for the first set of communication capabilities or the second set of communication capabilities; and activating the second set of communication capabilities, wherein based on activating the second set of communication capabilities, the user equipment is modified to be able to use the second set of communication capabilities for communication with the telecommunications network in addition to being able to use the first set of communication capabilities;

wherein the second set of communication capabilities corresponds to Long Term Evolution (LTE) networking capabilities, wherein the user equipment is sold without the capability of connecting to LTE networks, and wherein based on activating the second set of communication capabilities, the user equipment is modified so as to be able to connect to LTE networks.

9. A non-transitory computer-readable medium having processor-executable instructions stored thereon, wherein the processor-executable instructions, when executed, facilitate:

receiving, by a user equipment, at least one software component or software module or configuration information via a configuration and/or control channel between the user equipment and a telecommunications network, wherein the user equipment is sold having a first set of communication capabilities but not having a second set of communication capabilities, wherein the first set of communication capabilities is related to access-stratum capabilities of the user equipment, non-access stratum capabilities of the user equipment and/or other communication services of the user equipment, wherein the at least one software component or software module or configuration information is related to the second set of communication capabilities, wherein the second set of communication capabilities is related to access-stratum capabilities of the user equipment, non-access-stratum capabilities of the user equipment and/or other communication services of the user equipment, wherein the second set of communication capabilities corresponds to a different radio access technology and/or a different generation of radio access technology relative to the first set of communication capabilities, wherein the configuration and/or control channel is realized via a side channel, wherein the side channel is realized by using an auxiliary device, and wherein the side channel is established only temporarily using an access technology available to the auxiliary device which is different from an access technology used for the first set of communication capabilities or the second set of communication capabilities; and activating the second set of communication capabilities, wherein based on activating the second set of communication capabilities, the user equipment is modified to be able to use the second set of communication capabilities for communication with the telecommunications network in addition to being able to use the first set of communication capabilities;

wherein the second set of communication capabilities corresponds to Long Term Evolution (LTE) networking capabilities, wherein the user equipment is sold without the capability of connecting to LTE networks, and wherein based on activating the second set of communication capabilities, the user equipment is modified so as to be able to connect to LTE networks.

* * * * *